United States Patent [19]

Ratzker

[11] 4,401,235

[45] Aug. 30, 1983

[54] RECIPROCATING DRAWER TYPE PACKAGE VENDING MACHINE FOR DISPENSING VERTICAL BANKS OF PACKAGES

[76] Inventor: Herman B. Ratzker, 7 Jackson La., London N.6, England

[21] Appl. No.: 252,867

[22] Filed: Apr. 10, 1981

[30] Foreign Application Priority Data

Apr. 14, 1980 [GB] United Kingdom ................. 8012239

[51] Int. Cl.$^3$ ............................................. B65G 59/06

[52] U.S. Cl. .................................... 221/107; 221/256

[58] Field of Search ............... 221/268, 270, 276, 124, 221/125, 11, 108, 107, 103, 111, 256

[56] References Cited

U.S. PATENT DOCUMENTS 2,546,986 4/1951 Dressler ............................ 221/111

3,010,556 11/1961 Wawrzonek .................... 221/108 X

*Primary Examiner*—Stanley H. Tollberg

*Attorney, Agent, or Firm*—Kerkam, Stowell, Kondracki & Clarke

[57] ABSTRACT

The invention concerns a vending machine, e.g. of the coin-freed type, having a package-dispensing drawer (11) reciprocatable between a locked, retracted position and an open, extended dispensing position. The drawer length and the machine casing or frame are of sufficient depth to accommodate two vertical banks of packages one behind the other. The rear of the drawer (11) passes through and beyond an opening (14) in the rear wall (13) of the frame. Two upstanding slightly spaced-apart blocks (130,132) are secured to the drawer (11). The front block (130) supports the rear bank of packages and is of a height slightly less than that of the package. The two banks are separated by dividers the bottom edge of which is at a height less than twice the height of a package but more than the height of one package. The top surface (152) of the rear block (132) has projecting, freely rotatable rollers (150) to assist transfer of packages from the rear block to the front block (130).

9 Claims, 5 Drawing Figures

Figure 1:
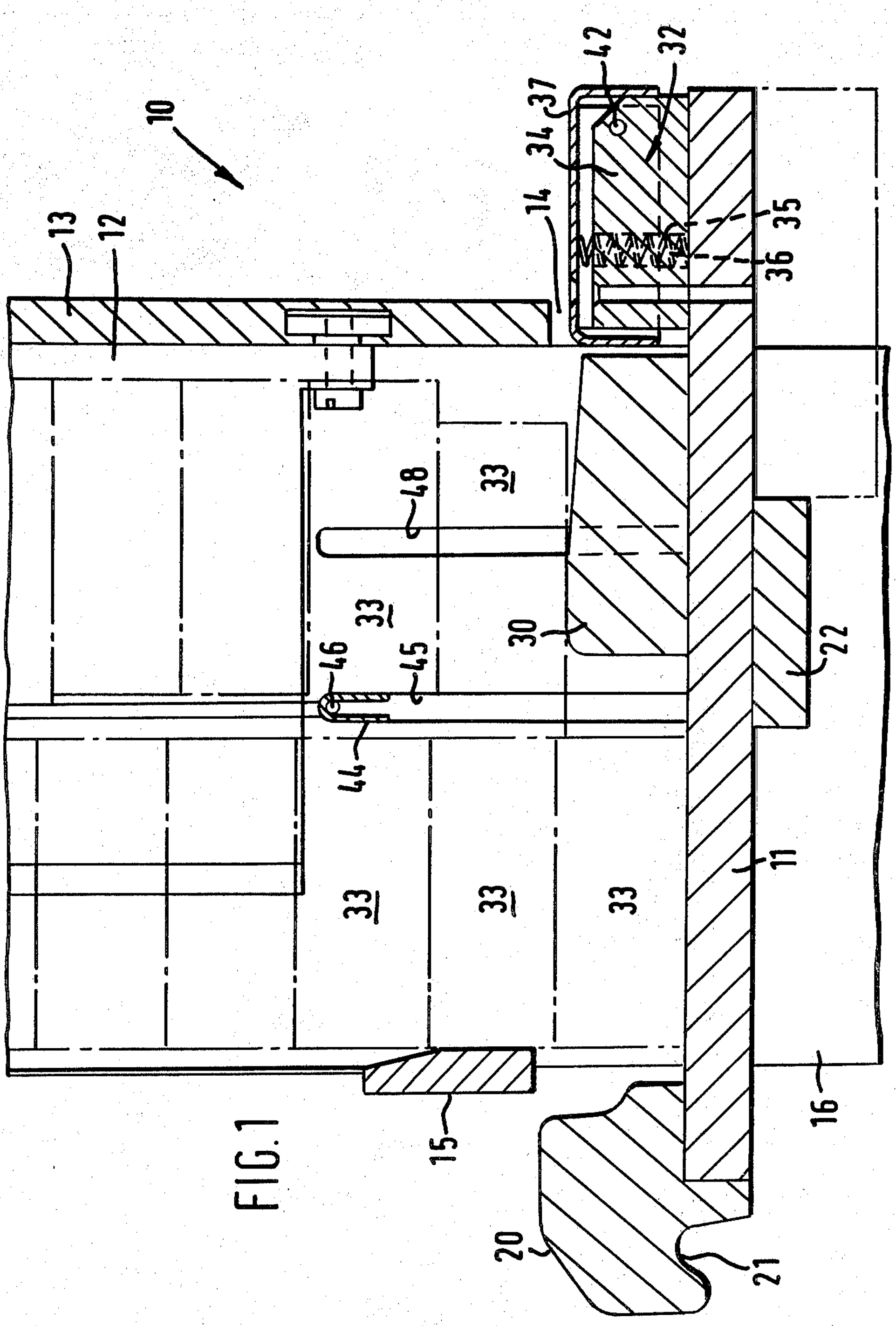

FIG.2
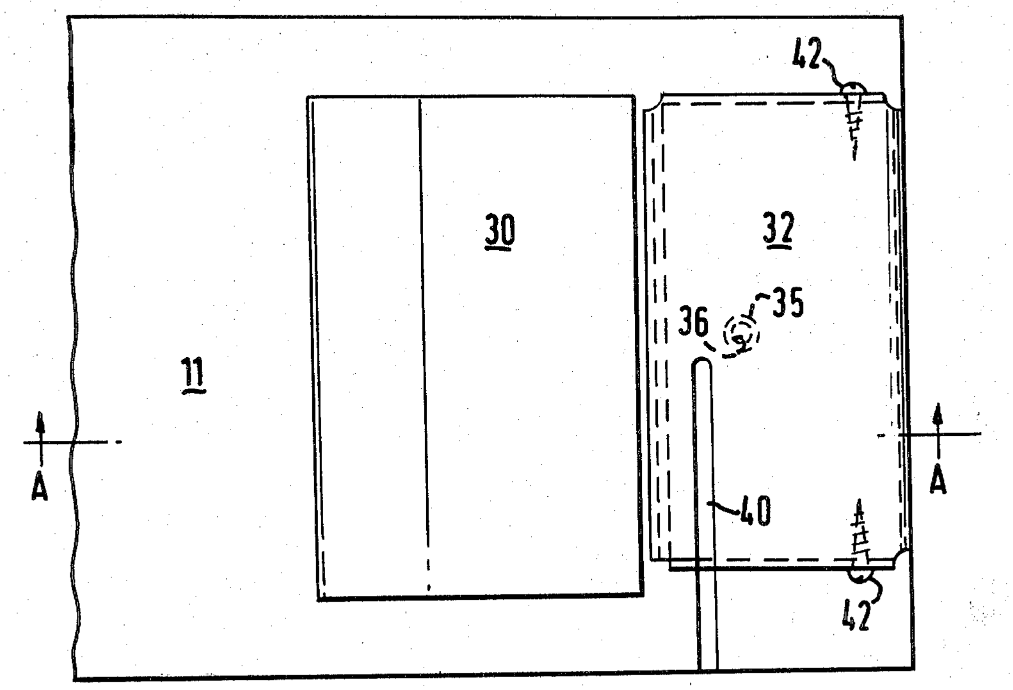
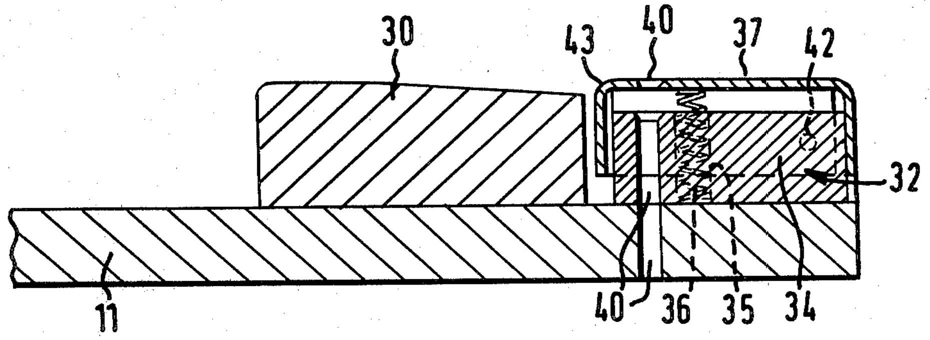
FIG.3

RECIPROCATING DRAWER TYPE PACKAGE VENDING MACHINE FOR DISPENSING VERTICAL BANKS OF PACKAGES

This invention concerns a vending machine and more particularly but not exclusively, an improved drawer and casing for a coin-freed (or token-freed) vending machine for dispensing packaged goods such as packs of cigarettes in a particularly simple, reliable and inexpensive manner.

Still more particularly, the present invention concerns an improved coin-freed vending machine capable of accommodating double columns or banks of cigarette packs or other goods to be dispensed in each of a plurality of vertical channels or compartments arranged in a side-by-side series within the machine.

Currently known and commercially available coin-freed vending machines e.g. for cigarette packs suffer from several disadvantages. Firstly, they are relatively expensive because the operating mechanism incorporates complicated electrical circuitry, electromagnets, and other components for controlling the checking of inserted coins, the unlatching of the dispensing drawer and the reciprocating movement of the drawer itself. Secondly, in the main, such known machines are single column machines and therefore have to be "topped up" at relatively frequent intervals. Such topping up is often effected by personnel from the supplier of the goods who has to travel to the site where the vending machine is placed, typically in bars, stations, cinemas, clubs and the like.

Yet another disadvantage of currently known machines is that the very nature of the complicated electrical and electromechanical mechanisms employed in the machines renders them prone to breakdown and each breakdown necessitates service by skilled and trained personnel. The operator of the machine, i.e. the owner of the premises where the machine is installed, suffers from the loss of trade during the time the machine is out of action and waiting to be serviced.

British patent specification No. 788093 discloses a double-banked coin-freed vending machine of a purely mechanical type. However, the mechanical construction disclosed is rather complicated and involves a number of moving parts, such as a pivotally swinging bell-crank lever separating the front and rear banks and a sprung, pivotally swinging gripper lever associated with the drawer. In contrast and as will be seen, the mechanisms of this invention have no such moving parts.

Accordingly, the present invention seeks to provide by simple means a vending machine of the pull-out drawer type in which the above-mentioned disadvantages are eliminated or at least considerably reduced, and which, moreover, is readily convertible from double-column use to single-column use should it e.g. be desired to dispense larger goods and which, in a further attempt to provide greater versatility, has limited means of adjusting the depth of the individual columns.

These and other aims are sought to be achieved in a vending machine according to the present invention, which comprises a casing with rear and side walls defining at least one vertical column of a depth capable of accommodating two juxtaposed banks of standard-sized packages of the goods to be dispensed, and a drawer defining the bottom of said column and reciprocatable between a closed and locked position and an open dispensing position, wherein the drawer is provided with a fixedly secured step of a height somewhat less than the height of a standard sized package, the length of this step (i.e. its dimension along the direction of the movement of the drawer) being at most equal to the depth in that same direction of the casing, and which in the closed position of the drawer projects rearwardly beyond the rear wall of the casing through an opening therein, and fixedly secured dividing means for dividing the interior space of the or each said column into two, the lower end of said dividing means being at a height above the top plane of the step by an amount substantially equal to twice the height of a said standard-sized package.

Preferably, the said step comprises two juxtaposed physically discrete blocks, of which the front block (as taken in the direction of drawer movement), has a rearwardly and downwardly sloping top edge and the rear block has a radiused forward edge; or the front block has a top edge parallel with the drawer surface and the rear block has rolling elements freely rotatably mounted therein about an axis normal to drawer movement, said elements projecting above the top surface of the rear block.

Preferably, the front block is readily removably secured to the drawer, whereby to convert the machine into a single-column machine after the dividing means have also been taken out.

Preferably, the rear block is fractionally higher than the front block. In the preferred embodiment of the invention, when the two banks supported by the drawer are filled up with packages, there will be one package fewer in the rear bank. On reciprocation of the drawer, e.g. after successive insertions of coins and freeing of the drawer movement by a coin-freed mechanism, firstly all the packages from the front bank are dispensed. During this time the bottom package in the rear bank resting on the top of the front block cannot move forwardly while there are still at least two packages left in the front bank because the penultimate package in the front bank prevents it from moving forward even though it could pass under the bottom edge of the dividing means. However, when the last package of the front bank is in the dispensing position, on forward movement of the drawer the bottom package of the rear bank moves forwardly under the dividing means to the top of the front block and when the drawer is closed again, it drops down forwardly of the front block while of course the packages in the rear bank all move down by an amount corresponding to the height of one package. Every time thereafter that the drawer is reciprocated, the lowermost package moves forwardly of the front block and drops into the drawer until such time as the last package is ready to be dispensed.

Figure 5:
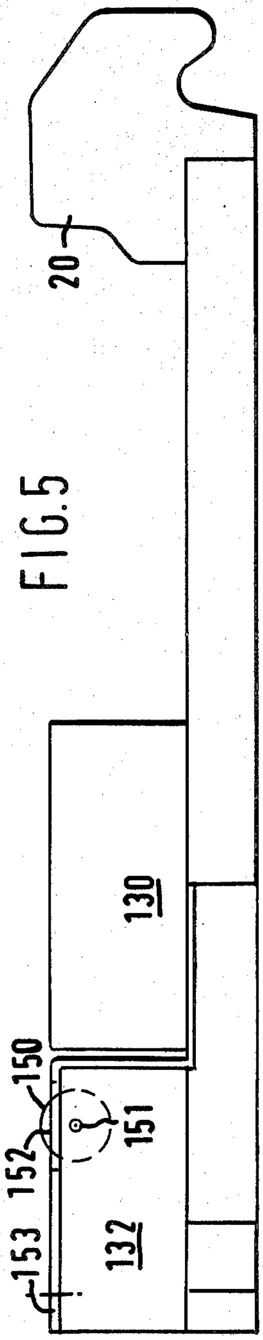
Figure 4:
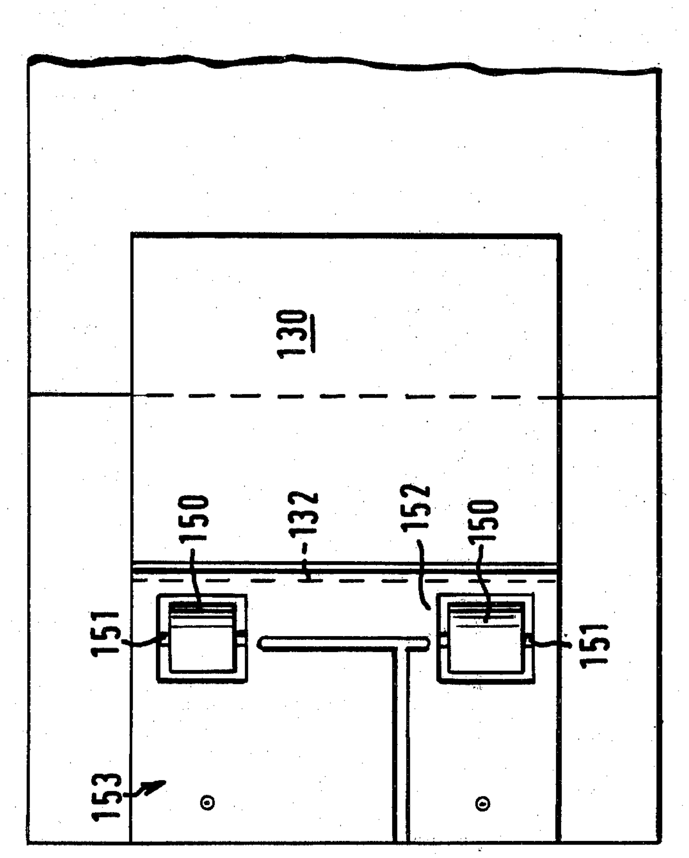

Preferred embodiments of the present invention will now be described with reference to the accompanying schematic drawings, wherein:

FIG. 1 is a transverse cross-section of a fragmentary part of a first embodiment of a vending machine according to the invention, FIG. 2 is a plan view of a detail of the drawer of FIG. 1, FIG. 3 is a section taken along the plane indicated by the line A—A in FIG. 2, and FIGS. 4 and 5 respectively correspond to FIGS. 2 and 3 but show a second preferred embodiment.

Referring first to the embodiment shown in FIGS. 1 to 3, there is shown a coin-freed vending machine 10 with a reciprocatable drawer 11, wherein for the sake of simplicity, the actual coin travel path, the mechanism for checking the coin(s) and the mechanism for controlling the reciprocation of the drawer 11 are not shown.

In FIG. 1, the front and rear of the machine casing are respectively at the left and right (as viewed) and the machine is to be thought of as extending in width on either side of the paper to form e.g. eight vertical dispensing columns, side by side, separated from each other by side walls 12. The machine casing additionally includes a rear wall 13 apertured at 14 to receive a portion of the drawer 11 projecting through it. The front wall of the machine casing is largely open to enable a purchaser to inspect the goods in the column and includes a cross-bar 15 and a bottom portion 16 in which the inserted coins are collected and which accommodates the non-illustrated portions of the mechanism.

The drawer 11 has a front handle 20 provided with a finger grip portion 21 for pulling it out and its rear end extends beyond the plane of the rear wall 13. The bottom of the drawer has an abutment block 22 which co-operates with a non-illustrated abutment of the front wall to limit the maximum permitted forward movement of the drawer 11.

The top surface of rear of the drawer 11 is provided with a step comprising two physically discrete blocks 30 and 32. The front block 30 is readily detachably secured by means not shown to the drawer 11 and is slightly wider as well as slightly higher than the rear block 32. In its simplest embodiment it is a unitary wooden block although it may be made from other materials also. As can be seen from FIG. 3 the top surface of the block 30 slopes rearwardly and downwardly towards the block 32.

In FIG. 1 chain lines indicate the contours of a standard-sized package 33 to be dispensed. It will be evident that the greatest height of the block 30 is less, by a small amount, than the height of the package 33, e.g. a packet of cigarettes or confectionery.

The block 32 may also be a simple wooden or plastics block but as can be seen in the preferred embodiment, it is in fact a multi-component part. The block 32 has a body 34 secured to the drawer 11 and has a bore 35 in which is located a coil compression spring 36 the lower end of which bears against the drawer 11 while its upper end bears against a plate 37 made e.g. of metal of U-shaped cross-section. The plate 37, the block body 34 underneath it as well as the drawer are provided with aligned respective slots forming part of the path 40 of a coin from its non-illustrated insertion slot on the front face of the machine to the coin-freed mechanism below the drawer 11.

The spring 36 is centrally of the width of the block 32 but off-centre in relation to the depth, see FIG. 2. Aligned pivot screws 42 extending through the side flanges of the plate 37 and the block body 34 allow the plate 37 to perform limited tilting movement. Thus, when a weight is placed on top of the U-shaped plate 37, it can pivot about the screws 42 against the action of the spring 36 so that its front portion tips slightly downwardly towards the front block 30 to erase or assist the transfer of a package from the block 32 to the block 30. This transfer movement is also assisted, of course, by the fact that the U-shaped plate has a rounded edge 43 at the critical position of transfer.

Reverting to FIG. 1, chain lines show the positions of the two banks of packages. These banks are separated at the bottom by a transverse bar 44 located in grooves 45 in the side walls 12 of the vending machine casing. The transverse bar 44 is an inverted U-shaped member and the base of the U is provided with a pair of spaced apertures through which is threaded the centre portion of a length of curtain wire 46, the ends of which (not shown) end in hooks that can be hooked on transversely extending rods (not shown) passed through the top portions of the side walls 12 of the machine. So, the two lengths of wire formed in this way separate the banks. As can be seen, the transverse bar 44 is positioned at a height from the top of the block 30 which is more than the height of one package but less than the height of two packages.

FIG. 1 also shows one of another pair of grooves 48 spaced from the ones (45) in which the bar 44 is located and which can be used to change the size of the front bank. At the top and vertically aligned with the second groove pair 48, there is a second rod, or at least apertures in the side walls for insertion of a second rod.

In operation of the apparatus described so far, on insertion of a coin and consequent freeing of the drawer mechanism, a user can grip the handle 20 and pull the drawer 11 forward until the abutment 22 stops the forward movement the magnitude of which corresponds to travel of the lowermost package in the front bank passing forwardly of the front plane of the machine so that the user can remove the package. In this position, the front block 30 is in the plane of the front bank and supports the packages above it while the rear block 32 slides under the lowermost package in the rear bank to support the latter. The presence of a package in the position "two up" from the front bank prevents the lowermost package of the rear bank from moving forwardly when the drawer 11 is pulled out. Then, on pushing the drawer 11 back into its illustrated (locked) position, the previously "two up" package of the front bank drops down to the lowermost position and all the other packages above it move downwardly by the corresponding amount. This is repeated until the last but one of the front packages have been dispensed. At that time, when the penultimate package drops down into the drawer 11 there is no longer a package above it to impede forward movement of the lowermost package in the rear bank and thus the lowermost package of the rear bank will slide into the "two-up" position of the front bank, ready to drop down in front of the block 30 into the front dispensing position when the drawer is closed; this process then repeats itself.

In this way, the rear bank will replenish the front bank and allow continued dispensing of packages to take place until the very last of the rear bank package drops on the front block 30. This last package is then dispensed by the agency of a weight (not shown) placed on top of it to cause it to move forwardly relatively to the block 30 when the drawer is next reciprocated.

The second preferred embodiment of the invention shown in FIGS. 4 and 5 is conceptually similar to that shown in FIGS. 1 to 3 and the differences only will now be described. Herein the front block 130 has a flat (non-sloping) surface. The rear block 132 includes a pair of spaced-apart rollers 150 mounted coaxially and freely rotatably on respective spindles 151 so that a portion (exaggerated somewhat in the Figures) projects upwardly beyond the top surface 152 of the rear block 132. This top surface 152 is constituted by a metal plate 153 suitable apertured to receive the rollers 150. The rollers 150 perform the task of facilitating the transfer of passages from the rear block 132 to the front block 130.

It will be seen that the preferred embodiments of the invention provide a simple, versatile highly reliable, jam-free drawer dispensing mechanism for a vending machine.

I claim:

1. A vending machine comprising a casing with rear and side walls defining at least one vertical column of a depth capable of accommodating two juxtaposed banks of standard-sized packages of the goods to be dispensed, and a drawer defining the bottom of said column and reciprocatable between a closed and locked position and an open, dispensing position, the improvement comprising a step fixedly secured to the drawer, the said step being of a height less than the height of a standard-sized package, the length of this step (i.e. its dimension along the direction of the reciprocating movement of the drawer) being at most equal to the depth of the casing measured in that same direction and which in the closed position of the drawer projects rearwardly beyond the rear wall of the casing through an opening therein, and dividing means fixedly secured to the casing for dividing the interior space of the or each said column into two, the lower end of said dividing means being at a height above the top plane of the step by an amount more than the height of a said standard-sized package but less than twice the said height, wherein the said step comprises two juxtaposed physically discrete blocks, of which the front block, taken in the direction of drawer movement, has a top surface parallel with the plane of said movement, while at least one rolling element is mounted in a freely rotatable manner in the rear block about an axis normal to said movement, said element(s) projecting above the top surface of the rear block.

2. A vending machine comprising a casing with rear and side walls defining at least one vertical column of a depth capable of accommodating two juxtaposed banks of standard-sized packages of the goods to be dispensed, and a drawer defining the bottom of said column and reciprocatable between a closed and locked position and an open, dispensing position, the improvement comprising a step fixedly secured to the drawer, the said step being of a height less than the height of a standard-sized package, the length of this step (i.e. its dimension along the direction of the reciprocating movement of the drawer) being at most equal to the depth of the casing measured in the same direction and which in the closed position of the drawer projects rearwardly beyond the rear wall of the casing through an opening therein, and dividing means fixedly secured to the casing for dividing the interior space of the or each said column into two, the lower end of said dividing means being at a height above the top plane of the step by an amount more than the height of a said standard-sized package but less than twice the said height, wherein the said step comprises two juxtaposed physically discrete blocks, of which the front block, taken in the direction of drawer movement has a rearwardly and downwardly sloping top edge, the rear block, taken in the direction of drawer movment, having a radiused forward edge.

3. A vending machine according to claim 1 wherein the front block is a simple wooden or plastics or metal block.

4. A vending machine according to claim 2, wherein the rear block is in the form of a spring-loaded and eccentrically pivoted plate.

5. A vending machine according to claim 1 wherein the front block is readily removably secured to the drawer to allow ready conversion of the machine into a single banked machine.

6. A vending machine according to claim 1 wherein the dividing means comprises a transverse rod passing through the top of the side walls of the machine and the lower end of the dividing means is an apertured bar, there being a curtain wire passed through the apertures of the bar with its ends hooked on said rod.

7. A vending machine according to claim 2 wherein the rear block is higher than the front block.

8. A vending machine comprising a casing with rear and side walls defining at least one vertical column of a depth capable of accommodating two juxtaposed banks of standard-sized packages of the goods to be dispensed, and a drawer defining the bottom of said column and reciprocatable between a closed and locked position and an open, dispensing position, the improvement comprising a step fixedly secured to the drawer, the said step being of a height less than the height of a standard-sized package, the length of this step (i.e. its dimension along the direction of the reciprocating movement of the drawer) being at most equal to the depth of the casing measured in that same direction and which in the closed position of the drawer projects rearwardly beyond the rear wall of the casing through an opening therein, and dividing means fixedly secured to the casing for dividing the interior space of the or each said column into two, the lower end of said dividing means being at a height above the top plane of the step by an amount more than the height of a said standard-sized package but less than twice the said height, wherein the said step comprises two juxtaposed physically discrete blocks, of which the front block, taken in the direction of drawer movement has a rearwardly and downwardly sloping top edge, the rear block, taken in the direction of drawer movement, having a radiused forward edge, and wherein the front block is a simple wooden or plastics or metal block.

9. A vending machine comprising a casing with rear and side walls defining at least one vertical column of a depth capable of accommodating two juxtaposed banks of standard-sized packages of the goods to be dispensed, and a drawer defining the bottom of said column and reciprocatable between a closed and locked position and an open, dispensing position, the improvement comprising a step fixedly secured to the drawer, the said step being of a height less than the height of a standard-sized package, the length of this step (i.e. its dimension along the direction of the reciprocating movement of the drawer) being at most equal to the depth of the casing measured in that same direction and which in the closed position of the drawer projects rearwardly beyond the rear wall of the casing through an opening therein, and dividing means fixedly secured to the casing for dividing the interior space of the or each said column into two, the lower end of said dividing means being at a height above the top plane of the step by an amount more than the height of a said standard-sized package but less than twice the said height, wherein the said step comprises two juxtaposed physically discrete blocks, of which the front block, taken in the direction of drawer movement has a rearwardly and downwardly sloping top edge, the rear block, taken in the direction of drawer movement, having a radiused forward edge, and wherein the front block is readily removably secured to the drawer to allow ready conversion of the machine into a single banked machine.

* * * * *